United States Patent [19]
Kaimai et al.

[11] Patent Number: 5,560,854
[45] Date of Patent: Oct. 1, 1996

[54] WORKING FLUID COMPOSITION FOR HFC REFRIGERANT COMPRESSOR CONTAINING BENZOTRIAZOLE DERIVATIVES, AND A PROCESS FOR IMPROVING LUBRICATION IN A COMPRESSOR

[75] Inventors: Takashi Kaimai; Hiroki Tawaki, both of Toda; Sumio Yokoo, Yokohama, all of Japan

[73] Assignees: Nissan Motor Co., Ltd., Yokohama; Japan Energy Corporation, Tokyo, both of Japan

[21] Appl. No.: 470,019

[22] Filed: Jun. 6, 1995

Related U.S. Application Data

[63] Continuation of Ser. No. 121,643, Sep. 16, 1993, abandoned.

[30] Foreign Application Priority Data

Sep. 18, 1992 [JP] Japan ..................... 4-249840

[51] Int. Cl.$^6$ .................... C09K 5/04; C10M 105/08; C10M 133/38
[52] U.S. Cl. ................ 252/68; 252/67; 508/281
[58] Field of Search .................. 252/68, 67, 50, 252/52 A, 56 R, 56 S

[56] References Cited

U.S. PATENT DOCUMENTS

| | | | |
|---|---|---|---|
| 3,623,987 | 11/1971 | Kerr et al. | 252/79 |
| 3,652,411 | 3/1972 | Commichau | 252/34.7 |
| 4,335,006 | 6/1982 | Bandlish et al. | 252/49.7 |
| 4,367,152 | 1/1983 | Wright et al. | 252/47.5 |
| 4,701,273 | 10/1987 | Brady et al. | 252/32.5 |
| 4,851,144 | 7/1989 | McGraw et al. | 252/67 |
| 5,185,092 | 2/1993 | Fukuda et al. | 252/67 |
| 5,202,044 | 4/1993 | Hagihara et al. | 252/68 |
| 5,407,592 | 4/1995 | Cheng et al. | 252/51.5 R |

FOREIGN PATENT DOCUMENTS

| | | |
|---|---|---|
| 475751 | 9/1991 | European Pat. Off. . |
| 501440 | 9/1992 | European Pat. Off. . |
| 51-98276 | 8/1976 | Japan . |
| 55-161895 | 12/1980 | Japan . |
| 1-259093 | 10/1989 | Japan . |
| 2-102296 | 4/1990 | Japan . |
| 3-128991 | 5/1991 | Japan . |
| 5-5098 | 1/1993 | Japan . |
| 5-70789 | 3/1993 | Japan . |
| 5-78689 | 3/1993 | Japan . |
| 5-209171 | 8/1993 | Japan . |
| 1061904 | 3/1967 | United Kingdom . |

*Primary Examiner*—Christine Skane
*Attorney, Agent, or Firm*—Oliff & Berridge

[57] ABSTRACT

A working fluid composition for a compression type refrigerator, comprising:

(A) a refrigerant composed of ammonia or at least one hydrofluorocarbon having the number of carbon being not more than 2 and containing no chlorine; and (B) a lubricant for the refrigerator, said lubricant comprising 100 parts by weight of a synthetic oil and 0.5 to 10.0 parts by weight of at least one benzotriazole derivative expressed by the following formula (I).

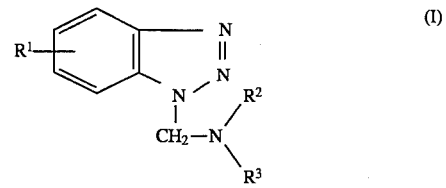

in which $R^1$ is hydrogen or an alkyl group having the number of carbons being 1–10, and $R^2$ and $R^3$ independently indicate an alkyl group having the number of carbons being 4–18.

14 Claims, No Drawings

WORKING FLUID COMPOSITION FOR HFC REFRIGERANT COMPRESSOR CONTAINING BENZOTRIAZOLE DERIVATIVES, AND A PROCESS FOR IMPROVING LUBRICATION IN A COMPRESSOR

This is a Continuation of application Ser. No. 08/121,643 filed Sep. 16, 1993, now abandoned.

BACKGROUND OF THE INVENTION

(1) Field of the Invention

The present invention relates to working fluid compositions for compression type refrigerators, which compositions are each composed of a specific refrigerant and a specific lubricant. More particularly, the invention relates to working fluid compositions for compression type refrigerators, which compositions are each composed of a refrigerant containing no chlorine, such as ammonia or a hydrofluorocarbon, and a lubricant containing a benzotriazole derivative to improve lubricating characteristic.

(2) Related Art Statement

Heretofore, naphthenic mineral oils, paraffinic mineral oils, alkylbenzolic synthesized oils and poly-α-olefinic synthetic oils are known as lubricants for refrigerators. Such oils are used for the purpose of reducing friction and wear and preventing seizing in sliding sections in compressors.

The refrigeration lubricants have different requirements from those of the ordinary lubricants in that since the former contact a refrigerant, the lubricant must have excellent stability to the refrigerant and excellent solubility with the refrigerant.

With respect to refrigerants containing chlorine, such as dichlorodifluoromethane (R12) conventionally used as a refrigerant, mineral oils such as naphthenic mineral oils, and paraffinic mineral oils, alkylbenzene or poly-α-olefine have been used. However, environmental problems are pointed out that the refrigerants containing chlorine, such as R12, break the ozone layer and impose serious and bad effects upon the environment. As new refrigerants substituting those refrigerants, hydrofluorocarbons (hereinafter abbreviated as "HFC"s) containing no chlorine, such as 1,1,1,2-tetrafluoroethane (R134a) have been proposed. However, naphthenic mineral oils, paraffinic mineral oils, alkylbenzoic synthesized oils, poly-α-olefinic oils or the like heretofore used do not dissolve into HFCs such as R134a, and thus they cannot be used therefor.

In order to solve the above problem, Japanese patent application Laid-open No. 1-259,093 etc. proposed to use polyoxyalkylene glycol-based synthetic oils, and Japanese patent application Laid-open No. 3-128,991 etc. proposed to use ester-based synthetic oils. These synthetic oils are well dissolved into R134a, which solves the above-mentioned problem.

However, since extreme-pressure effect (improvement on lubricity) of intramolecular chlorine atoms cannot be expected in the case of the HFC refrigerant containing no chlorine, such as R134a, lubrication becomes poor at a bearing, a piston, a sealing device, etc. of a refrigerator. Consequently, energy is lost, wear becomes greater, or seizing is provoked, or decomposition or degradation of the refrigerant or the lubricant is promoted to cause corrosion. Therefore, high lubricity is required for the refrigeration lubricants composed of such synthetic oils.

Further, phosphorus compounds and sulfur compounds conventionally used, such as tricresil phosphate or dialkyl sulfide, have smaller lubricity-improving effect, and poor solubility with R134a. Further, these compounds exhibit severe corrosiveness against metallic materials such as copper alloys. Wear is a big problem in refrigerators having severe use conditions. Particularly, since wear is likely to occur in the case of refrigerators for car air conditioners, etc. using an aluminum alloy or a copper alloy in a sliding part, strong demand has existed to reduce wear.

On the other hand, it is known that since benzotriazole and benzotriazole derivatives are adsorbed onto the surface of a metal and protect the sliding surface, benzotriazole and the benzotriazole derivatives are used as a corrosion-preventing agent, a metal-deactivator or antioxidant, in a variety of lubricants. Further, Japanese patent application Laid-open No. 2-102,296, EP-A-501440, etc. disclose that lubricants in which benzotriazole or a benzotriazole derivative is blended together with a non-chlorine type refrigerant such as R134a are used in refrigeration oils. In these publications, it is described that benzotriazole or a benzotriazole derivative thereof is used as an antioxidant, or a metal-inactivating agent, or is used to protect the surface of a metal due to corrosion with a carboxylic acid or prevent a copper-plating phenomenon. However, these publications are utterly silent about improvement upon wear resistance.

Japanese patent application Laid-open No. 2-102,296 describes that metal-deactivator such as benzotriazole and benzotriazole derivatives may be used as an antioxidant, and benzotriazole and benzotriazole derivatives are recited therein as antioxidants together with phenol-based, amine-based or phosphorus-based antioxidants. However, with respect to benzotriazole and benzotriazole derivatives, a wear resistance-improving effect is not disclosed at all. In addition, this publication does not disclose at all what chemical structures the benzotriazole derivatives have.

EP501440 describes refrigerator oils in which benzotriazole or a benzotriazole derivative is blended as an additive into a special ester-based synthetic oil together with a phosphorus-based anti-wear agent, an epoxy compound and a chelate-based metal-deactivator. However, benzotriazole derivatives are used for the purpose of protecting the surface against corrosion of a metal with a carboxylic acid or preventing copper-plating. Therefore, the addition amount of the benzotriazole or the benzotriazole derivative is low. This reference does not refer to an anti-wear effect of the benzotriazole derivative.

Benzotriazole described in Japanese patent application Laid-open No. 2-102,296 and EP-A-501440 is a compound expressed by the following formula, which has been used in various lubricants. It is well known that benzotriazole is effective for the prevention of oxidation and corrosion, but this benzotriazole has completely no wear-preventing effect.

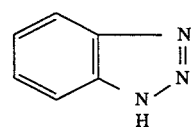

SUMMARY OF THE INVENTION

It is therefore an object of the present invention to provide working fluid compositions for compression type refrigerators, which fluid compositions exhibit extremely excellent wear resistance when used in the compression type refrigerator. The fluid compositions are each composed of a refrigerant containing no chlorine, such as hydrofluorocarbon or ammonia, and a synthetic oil used as a base oil and exhibiting good solubility with said refrigerant, such as a polyoxyalkylene glycol or an ester.

The present inventors have discovered that a lubricant oil compounded with a specific benzotriazole derivative is compatible with an HFC or ammonia refrigerant, and exhibits an extremely excellent wear resistance when used in a compression type refrigerator, and they accomplished the present invention.

That is, the present invention is directed to a working fluid composition for a compression type refrigerator containing the following (A) and (B):

(A) a refrigerant composed of ammonia or at least one kind of a hydrofluorocarbon having the number of carbons being not more than 2 and containing no chlorine; and (B) a lubricant for the refrigerator, said lubricant comprising 100 parts by weight of a synthetic oil and 0.5 to 10.0 parts by weight of at least one derivative of benzotriazole expressed by the following formula (I).

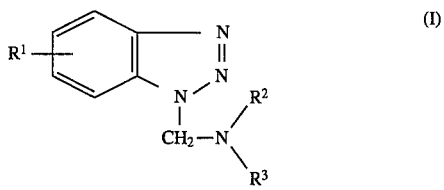

in which $R^1$ is hydrogen or an alkyl group having the number of carbons being 1–10, and $R^2$ and $R^3$ independently indicate an alkyl group having the number of carbons being 4–18.

The benzotriazole derivatives used in the present invention are expressed by the above formula (I). The present inventors have discovered that solubility and wear resistance vary depending upon the number of carbon atoms of an alkyl group added to benzotriazole and that when the number of carbons in $R^2$ and/or $R^3$ increases, wear resistance is greatly improved.

In the formula (I), $R^1$ is a hydrogen or an alkyl group having the number of carbons being 1 to 10. The smaller the number of carbons of the alkyl group, the better the solubility with the refrigerant. An alkyl group having the number of carbons being more than 10 cannot be used, because it has poor solubility with the refrigerant. $R^1$ is preferably hydrogen or an alkyl group having the number of carbons being 1 to 4. $R^1$ is more preferably hydrogen or a methyl group. $R^2$ and $R^3$ independently denote an alkyl group having the number of carbons being 4 to 18, preferably an alkyl group having the number of carbons being 4 to 12, and more preferably an alkyl group having the number of carbons being 6 to 10. When the number of carbons in alkyl group is in the range of 4 to 18, a refrigeration lubricant exhibiting excellent solubility and wear resistance can be obtained. When the number of carbons of $R^2$ and $R^3$ is less than 4, effects of preventing wear or improving lubricity cannot be expected. On the other hand, an alkyl group having the number of carbons being more than 18 cannot be used, because its solubility with the refrigerant becomes poorer.

The alkyl groups of $R^2$ and $R^3$ may be either a straight chain or a branched chain, and may be saturated or unsaturated. However, from the standpoint of stability and lubricity, straight-chain, saturated alkyl groups are preferred.

The compounds of the formula (I) may be produced by any conventional process. For example, these compounds can be obtained by a process described in Japanese patent application laid-open No. 51-89,276 in which formaldehyde and a secondary amine are reacted with benzotriazole.

When at least one kind of the benzotriazole derivatives expressed by the formula (I) is mixed, singly or in the form of a mixture, in a mixing rate of 0.5 to 10 parts by weight, preferably 1 to 5 parts by weight, more preferably 1 to 3 parts by weight, into 100 parts by weight of a base oil composed of a synthetic oil such as a polyoxyalkylene glycol or a carboxylate ester, sufficient lubricity and wear resistance can be obtained even in combination of this synthetic oil and a refrigerant containing no chlorine such as an HFC or ammonia, which combination is uncapable of being expecting to have good lubricity. If the mixing rate is less than 0.5 parts by weight, sufficient effects upon lubricity and wear resistance cannot be obtained through the addition of the derivative. If the mixing rate is more than 10 parts by weight, further improvement on the lubricity and wear resistance cannot be realized for the increased addition amount, which not only results in bad economy but also leads to deterioration in other properties of the lubricant in the refrigerator, particularly, deterioration in solubility with the refrigerant. Thus, the mixing rate of less than 0.5 or more than 10 is not preferable.

The synthetic oil used as the base oil according to the present invention includes a polyoxyalkylene glycol, a modified polyoxyalkylene glycol, a carboxylic acid ester or a mixture thereof.

The polyoxyalkylene glycol includes at least one compound represented by R(OAH)n in which R is a hydrocarbon residue (alkyl group) in which a hydroxyl group is removed from a monoalcohol having the number of carbon or carbons being 1 to 18 or a residue in which an entire part or a part of hydroxyl groups are removed from a polyol having the number of carbons being 2 to 18, A is a polymerized chain of 3 to 100 units of one or more kinds of oxyalkylene units having the number of carbons being 2 to 4, and n is a positive integer equal to or less than the number of hydroxyl group or groups of the original alcohol of R. The polymerized chain of A may be a random copolymer or a block copolymer of two or more different kinds of oxyalkylenes, or an appropriate mixture thereof. The figure "n" is preferably an integer from 1 to 6. A polyoxyalkylene glycol monoalkyl ether having n=1 is preferred, and such a polyoxyalkylene glycol monoalkyl ether is widely used, and easily available.

As the modified polyoxyalkylene glycol, a compound in which a hydrogen of a hydroxyl group at a terminal end of the above polyoxyalkylene glycol is replaced by an alkyl group or a compound in which a hydroxyl group at the above terminal end is esterified by an carboxylic acid. When n=1, this compound is a polyoxyalkylene glycol dialkyl ether.

As the carboxylic acid ester, an ester obtained by esterification reactions between a polyol and a monocarboxylic acid, or between a monoalcohol and a polycarboxylic acid may be recited. Preferably, recitation may be made of polyol esters obtained between a polyol having the number of carbons being 5 to 15, more preferably neopentyl polyol such as neopentyl glycol, trimethylol propane, or pentaerythritol and a straight-chain and/or branched-chain saturated monocarboxylic acid having the number of carbons being 4 to 12, more preferably a straight-chain saturated monocarboxylic acid having the number of carbons being 4 to 6, a branched-chain saturated monocarboxylic acid having the number of carbons being 7 to 9 or a mixed acid thereof. However, a complex ester obtained by an esterification reaction among a polyol, a polycarboxylic acid, and a monocarboxylic acid or a monoalcohol is not preferred, because of poor stability in hydrolysis.

Among these synthetic oils, the polyoxyalkylene glycols or the modified polyoxyalkylene glycols are more preferable than the esters, because when the benzotriazole derivative used in the present invention is added, a smaller addition amount of the derivative can exhibit greater wear-reducing effect.

Furthermore, among the polyoxyalkylene glycols, an compound expressed by a formula: RO(AO)m(EO)nH has higher lubricity, and also exhibits excellent lubricity and wear resistance when a benzotriazole derivative used in the present invention is added. In this formula, R is an alkyl group having the number of carbons being 1 to 8, preferably an alkyl group having the number of carbons being 1 to 4, particularly preferably a methyl group or an ethyl group. AO is an oxypropylene group and/or an oxybutylene group. When $(AO)_m$ is constituted by both these oxyalkylene groups, $(AO)_m$ may be either a random or block copolymer. In addition, $(AO)_m$ may be a random copolymer or a block copolymer in which an oxyethylene group is contained in these oxyalkylene groups. EO is an oxyethylene group, and m and n are integers greater than 0.

The constituent units R, AO and EO are arranged in the order shown in the above formula. The viscosity of the polyoxyalkylene glycol monoalkyl ether of the formula may be appropriately selected depending upon the kind of the refrigerant used, and the type and use conditions of the refrigerator under consideration of lubricity, sealingness, energy saving, solubility with a refrigerant, etc. Generally speaking, the kinetic viscosity at 40° C. of the polyoxyalkylene glycol monoalkyl ether is preferably about 3 to about 150 cSt, and this kinetic viscosity can be adjusted by appropriately selecting values of m and n.

A polyoxyalkylene glycol dialkyl ether has a chemical structure in which a hydrogen in a hydroxyl group at a terminal end of the above formula (H in the above formula) is replaced by R', that is, a $C_{1-8}$ alkyl group, preferably $C_{1-4}$ alkyl group, more preferably a methyl group or an ethyl group. This polyoxyalkylene glycol dialkyl ether has the chemical structure of a formula: $RO(AO)_m(EO)_nR'$ and lubricity lower than that of the above mono ether. However, this dialkyl ether has more excellent hygroscopic resistance and stability than those of the mono ether. Therefore, the polyoxyalkylene glycol dialkyl ether is highly effective in enhancing lubricity and wear resistance when the benzotriazole derivative used in the present invention is blended thereinto. With respect to R, AO and EO, the same as in the mono ether can be applied.

Furthermore, when the benzotriazole derivative used in the present invention is blended into a mixed oil of the above polyoxyalkylene glycol monoalkyl ether and the above polyoxyalkylene glycol dialkyl ether, extremely highly practical refrigeration lubricant having excellent total performance such as lubricity, hygroscopic resistance, stability, wear resistance, etc. can be obtained. When this mixture is mixed with a HFC refrigerant, the working fluid composition having excellent practical performance for compression type refrigerators according to the present invention can be obtained.

The viscosity of each of the above synthetic oils used as base oil may differ depending upon the use of the refrigerator. Generally speaking, this viscosity at 40° C. is in a range of 3 to 150 cSt, and preferably in a range of 5 to 120. For example, in the case of the home refrigerator, the viscosity of the synthetic oil is 3 to 50 cSt, preferably 5 to 50 cSt, and an ester-based synthetic oil is preferably used. In the case of a car air conditioner, the viscosity of the synthetic oil is 20 to 150 cSt, preferably 40 to 120 cSt, and a PAG-base synthetic oil such as a polyoxyalkylene glycol or modified polyoxyalkylene glycol is preferably used. The viscosity of each of the synthetic oils may be adjusted by appropriately selecting the kinds of an alcohol and a fatty acid used as raw materials in the case of the ester. Further, in the case of polyoxyalkylene glycols or modified polyoxyalkylene glycols, the viscosity of the synthetic oil may be mainly controlled by controlling the polymerization degree (m, n) of the oxyalkylene or by appropriately selecting and mixing two or more kinds of polyoxyalkylene glycols and/or modified polyoxyalkylene glycols having different viscosities.

The refrigerant used in the present invention is ammonia or a $C_1$ or $C_2$ hydrofluorocarbon, containing no chlorine. As the above hydrofluorocarbon, 1,1,1,2-tetrafluoroethane (R-134a), difluoromethane (R-32), 1,1-difluoroethane (R-152a), and pentafluoroethane (R-125) are particularly suitable. When ammonia is used as a refrigerant, it is preferable that a modified polyoxyalkylene glycol having the viscosity of about 20 to 70 cSt in which all hydrogens in hydroxyl groups at terminal ends of the above polyoxyalkylene glycol are replaced by alkyl groups is used together. The polyoxyalkylene glycol or the modified polyoxyalkylene glycol in which hydroxyl groups remain are not preferable, because there is the possibility that the glycol is oxidized, the resulting oxide product forms a salt with ammonia, and the salt plugs a capillary of the refrigerator, or the surface of a heat-exchange tube is coated with the salt to deteriorate the heat efficiency or cause damage in the machinery. Further, the carboxylic acid ester is unfavorably used together with the ammonia refrigerant, because the carboxylic acid ester is hydrolyzed to a carboxylic acid, and this acid forms a salt with ammonia.

The mixing ratio (A)/(B) between the refrigerant (A) and the refrigeration lubricant (B) is preferably 9/1 to 4/6, more preferably 5/1 to 4/6 in terms of weight ratio, and may be appropriately set depending upon the kinds of the refrigerant and the refrigerator used, etc. For example, it is preferable that this mixing ratio (A)/(B) is 9/1 to 7/3 in the case of the car air conditioner using R134a as a refrigerant, and 6/4 to 4/6 in the case of the home refrigerator. The ratio (A)/(B) is preferably 98/2 to 70/30 when ammonia and a modified polyoxyalkylene glycol are used as the refrigerant (A) and the refrigeration lubricant (B), respectively.

Moreover, in order to improve total performance, a known additive for the refrigerator may be added, if necessary. For example, in order to improve stability of the lubricant composition, an epoxy compound such as a phenylglycidyl ether type epoxy compound, a glycidyl ester type epoxy compound, an epoxidized fatty acid monoester and an epoxidized vegelable oil may be added. In addition, an antioxidant such as a phenol, for example, di-tert-butyl-p-crezol or bisphenol, or an amines such as phenyl-α-naphtylamine-N,N-di-(2-naphtyl)-p-phenylene diamine, an oily agent such as a fatty acid, a defoaming agent such as silicone, etc. may be added. These additives may be added within addition amounts ordinarily employed, singly or in a combined state of plural kinds of them.

The working fluid composition for the compression type refrigerator according to the present invention employs, as a refrigerant, ammonia or a hydrofluorocarbon containing no chlorine. However, when the fluid composition is used in the refrigerator, the composition exhibits extremely high lubricity and large wear-preventing effect for copper alloys or aluminum alloys particularly susceptible of wear. Thus, the fluid composition of the present invention can largely enhance service life and reliability of the refrigerator. Therefore, the fluid composition of the invention can be favorably used particularly for coolers having a reciprocating type, rotary type or a swash plate type compressors, for example, car air conditioners, air conditioners, dehumidifiers, home refrigerators, freezers, freezing refrigerators, vending machines, show casings, chemical plants, etc. as well as coolers with centrifugal type compressors.

(EXAMPLES AND COMPARATIVE EXAMPLES)

The present invention will be more concretely explained based on examples and comparative examples. However, the invention is not limited to the following examples at all.

Example 1

A refrigeration lubricant is prepared by adding 0.5 parts by weight of a compound having the following formula (hereinafter referred to briefly as "BTA-A") as a benzotriazole derivative to 100 parts by weight of a synthetic lubricant of polyoxypropyrene glycol monomethyl ether (hereinafter referred to briefly as "PAG") having the formula: $CH_3O[CH_2CH(CH_3)O]nH$ with the average molecular weight of about 1,000 and a kinetic viscosity at 40° C. being 54 cSt.

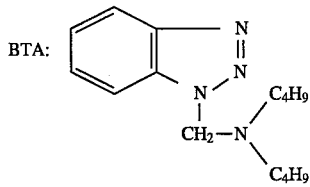

Lubricity of the resulting lubricant is evaluated by a Falex wear tester. A weight-reduced amount of a pin due to wear is 21 mg. Stability of the lubricant under an atmosphere of an HFC refrigerant is evaluated by a floc-point test. A floc point is not more than −20° C.

The Falex wear test and the floc-point test are effected in the following procedures for the evaluation of the lubricity and stability of the lubricant, respectively.

Falex wear test:

According to ASTM D2670, lead bronze (LBC-2) and iron (AISI-1137) are used as a pin and a block, respectively, the temperature of the lubricant for a refrigerator is set at 40° C. at the time of the start of the test, and the tester is operated for 1 hour under a load of 300 lbs, while refrigerant R-134a is being blown at a rate of 70 ml/min. After the test, the weight-reduced amount of the pin due to wear is measured.

Floc-point test:

Into a glass tube are charged 0.6 g of the lubricant for the refrigerator and 2.4 g of the refrigerant R-134a, which is then cooled at a rate of 1° C./min. A temperature at which floc is precipitated is measured.

Example 2

Into the same amount of PAG as in Example 1 is added 0.5 parts by weight of a compound having the following formula (hereinafter referred to as BTA-B) as a benzotriazol derivative, thereby preparing a lubricant for the refrigerator.

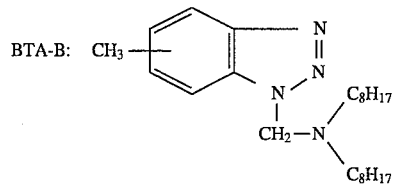

Lubricity and stability of the lubricant are evaluated by the same methods as in Example 1. The weight-reduced amount of the pin due to wear is 18 mg, and the floc point is not more than −20° C.

Example 3

Into the same amount of PAG as used in Example 1 is added 1.0 parts by weight of the same BTA-B as a benzotriazole derivative as used in Example 2, thereby preparing a lubricant for the refrigerator.

Lubricity and stability of the lubricant are evaluated by the same methods as in Example 1. The weight-reduced amount of the pin due to wear is 18 mg, and the floc point is not more than −20° C.

Example 4

Into the same amount of PAG as used in Example 1 is added 3.0 parts by weight of the same BTA-B as a benzotriazole derivative as used in Example 2, thereby preparing a lubricant for the refrigerator.

Lubricity and stability of the lubricant are evaluated by the same methods as in Example 1. The weight-reduced amount of the pin due to wear is 17 mg, and the floc point is not more than −20° C.

Example 5

Into 100 parts by weight of a polyol ester (hereinafter referred to briefly as "ESTER") is added the same 0.5 parts by weight of the same BTA-B as in Example 2 as a benzotriazole derivative, thereby preparing a lubricant for the refrigerator. The above ESTER has a molecular weight of about 356 and a kinetic viscosity of 7.4 cSt at 40° C., and is obtained by stoichiometrically reacting neopentyl glycol and 2-ethylhexanic acid.

Lubricity and stability of the lubricant are evaluated by the same methods as in Example 1. The weight-reduced amount of a pin due to wear is 19 mg, and the floc point is not more than −20° C.

Example 6

Into the same amount of the ESTER as in Example 5 is added 5.0 parts by weight of the same BTA-B as in Example 2, thereby obtaining a lubricant for the refrigerator.

Lubricity and stability of the lubricant are evaluated by the same methods as in Example 1. The weight-reduced amount of a pin due to wear is 17 mg, and the floc point is not more than −20° C.

Example 7

Into the same amount of the ESTER as in Example 5 is added 8.0 parts by weight of the same BTA-B as in Example 2, thereby obtaining a lubricant for the refrigerator.

Lubricity and stability of the lubricant are evaluated by the same methods as in Example 1. The weight-reduced amount of a pin due to wear is 16 mg, and the floc point is not more than −20° C.

Comparative Example 1

With respect to the same PAG as in Example 1 except that no benzotriazole derivative is added, lubricity and stability of the lubricant PAG alone are evaluated by the same methods as in Example 1. The weight-reduced amount of a pin due to wear is 325 mg, and the floc point is not more than −20° C.

Comparative Example 2

With respect to the same ESTER as in Example 5 except that no benzotriazole derivative is added, lubricity and stability of a lubricant of the ESTER alone are evaluated by the same methods as in Example 1. The weight-reduced amount of a pin due to wear is 294 mg, and the floc point is not more than −20° C.

Comparative Example 3

Into the same amount of PAG as in Example 1 is added 0.05 parts by weight of a benzotriazole having the following formula (hereinafter referred to briefly as "BTA-C"), thereby preparing a lubricant for the refrigerator.

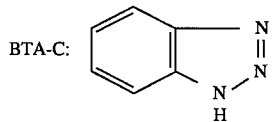

Lubricity and stability of the lubricant are evaluated by the same methods as in Example 1. The weight-reduced amount of a pin due to wear is 317 mg, and the floc point is not more than −20° C.

Comparative Example 4

Into the same amount of PAG as in Example 1 is added 0.2 parts by weight of the same BTA-C as in Comparative Example 3 as benzotriazole, thereby preparing a lubricant for the refrigerator.

Lubricity and stability of the lubricant are evaluated by the same methods as in Example 1. The weight-reduced amount of a pin due to wear is 331 mg, and the floc point is not more than −20° C.

Comparative Example 5

Into the same amount of PAG as in Example 1 is added 0.5 parts by weight of a compound having the following formula (hereinafter referred to briefly as "BTA-D") as a benzotriazole derivative, thereby preparing a lubricant for the refrigerator.

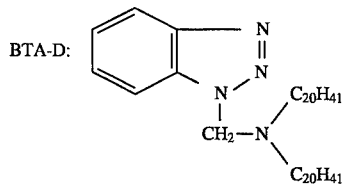

Lubricity and stability of the lubricant are evaluated by the same methods as in Example 1. The weight-reduced amount of a pin due to wear is 22 mg. Since the floc is precipitated at room temperature, measurement of floc point is impossible.

Comparative Example 6

Into the same amount of PAG as in Example 1 is added 0.005 parts by weight of the same BTA-B as in Example 2 as a benzotriazole derivative, thereby preparing a lubricant for the refrigerator.

Lubricity and stability of the lubricant are evaluated by the same methods as in Example 1. The weight-reduced amount of a pin due to wear is 87 mg, and the floc point is not more than −20° C.

Comparative Example 7

Into the same amount of PAG as in Example 1 is added 0.1 parts by weight of the same BTA-B as in Example 2 as a benzotriazole derivative, thereby preparing a lubricant for the refrigerator.

Lubricity and stability of the lubricant are evaluated by the same methods as in Example 1. The weight-reduced amount of a pin due to wear is 32 mg, and the floc point is not more than −20° C.

Comparative Example 8

Into the same amount of ESTER as in Example 5 is added 0.1 parts by weight of the same BTA-A as in Example 1 as a benzotriazole derivative, thereby obtaining a lubricant for the refrigerator.

Lubricity and stability of the lubricant are evaluated by the same methods as in Example 1. The weight-reduced amount of a pin due to wear is 62 mg, and the floc point is not more than −20° C.

It is seen from the above Examples and Comparative Examples that the lubricants for the refrigerant in Examples 1 through 7 are more excellent than those in Comparative Examples 1 through 4 and Comparative Examples 6 through 8 in terms of wear against the copper alloy. Comparative Example 5 has small wear, but poor solubility with the refrigerant as an additive and is precipitated as a floc at room temperature.

What is claimed is:

1. A working fluid composition for a compression type refrigerator, said working fluid composition comprising:
   (A) a hydrofluorocarbon refrigerant comprising at least one hydrofluorocarbon having one or two carbons; and
   (B) a lubricant for the refrigerator, said lubricant comprising:
      (B1) at least one polyoxyalkylene glycol derivative having a formula selected from the group consisting of Formula (II), Formula (III) and Formula (IV) as a base oil; and
      (B2) an anti-wear agent comprising at least one benzotriazole derivative having formula (I), said at least one benzotriazole derivative being mixed in an amount of 0.5–10 parts by weight relative to 100 parts by weight of said base oil;
   wherein a weight ratio of said refrigerant (A) to said lubricant (B) is 90:10 to 40:60; and Formula (I) is:

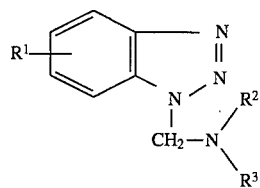

in which $R^1$ is H or an alkyl group having 1–10 carbon atoms, and $R^2$ and $R^3$ are identical with or different from each other, and each denote an alkyl group having 4–18 carbon atoms;

Formula (II) is: $R^4(OAH)_n$ in which $R^4$ is an alkyl group having 1–8 carbon atoms, A is a polymerized unit of oxypropylene groups, and n is 1, and said $R^4(OAH)_n$ has a viscosity of 3–150 cSt at 40° C.;

Formula (III) is: $R^5$—O—$(AO)_m(EO)_n$—H in which $R^5$ is an alkyl group having 1–8 carbon atoms, AO is an oxypropylene group, EO is an oxyethylene group, m and n independently denote an integer of 1 or more, and said $R^5$—O—$(AO)_m(EO)_n$—H has a viscosity of 3–150 cSt at 40° C.; and Formula (IV) is: $R^6$—O—$(AO)_m(EO)_n$—$R^7$ in which $R^6$ and $R^7$ are identical with or different from each other, and each denote an alkyl group having 1–8 carbon atoms, AO is an oxypropylene group, EO is an oxyethylene group, m and n are identical with or different from each other, and denote an integer of one or more, and said $R^6$—O—$(AO)_m(EO)_n$—$R^7$ has a viscosity of 3–150 cSt at 40° C.

2. The working fluid composition according to claim 1, wherein said benzotriazole derivative of said formula (I) is mixed in an amount of 1.0–10 parts by weight relative to 100 parts by weight of said base oil.

3. The working fluid composition according to claim 1, wherein said benzotriazole derivative of said formula (I) is mixed in an amount up to 5 parts by weight relative to 100 parts by weight of said base oil.

4. The working fluid composition according to claim 1, wherein in said benzotriazole derivative of said formula (I), $R^1$ is selected from the group consisting of H and an alkyl group having 1–4 carbons, and $R^2$ and $R^3$ are each an alkyl group having 4–18 carbon atoms.

5. The working fluid composition according to claim 4, wherein in said benzotriazole derivative of said formula (I), $R^1$ is selected from the group consisting of H and an alkyl group having 1 carbon atom, and $R^2$ and $R^3$ are each an alkyl group having 4–12 carbon atoms.

6. The working fluid composition according to claim 1, wherein $R^1$ is H.

7. The working fluid composition according to claim 1, wherein $R^1$ is a methyl group.

8. A process for improving lubrication in a compression type refrigerator using a working fluid composition, comprising adding to a compression type refrigerator said working fluid composition comprising:

(A) a hydrofluorocarbon refrigerant comprising at least one hydrofluorocarbon having one or two carbons; and (B) a lubricant for the refrigerator, said lubricant comprising:

(B1) at least one polyoxyalkylene glycol derivative having a formula selected from the group consisting of Formula (II), Formula (III) and Formula (IV) as a base oil; and (B2) an anti-wear agent comprising at least one benzotriazole derivative having Formula (I), said at least one benzotriazole derivative being mixed in an amount of 0.5–10 parts by weight relative to 100 parts by weight of said base oil, wherein a weight ratio of said refrigerant (A) to said lubricant (B) is 90:10 to 40:60; and Formula (I) is:

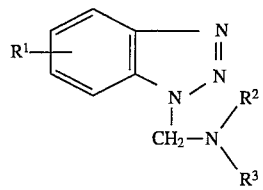

in which $R^1$ is H or an alkyl group having 1–10 carbon atoms, and $R^2$ and $R^3$ are identical with or different from each other, and each denote an alkyl group having 4–18 carbon atoms;

Formula (II) is: $R^4(OAH)_n$ in which $R^4$ is an alkyl group having 1–18 carbon atoms, A is a polymerized unit of oxypropylene groups, and n is 1, and said $R^4(OAH)_n$ has a viscosity of 3–150 cSt at 40° C.;

Formula (III) is: $R^5$—O—$(AO)_m(EO)_n$—H in which $R^5$ is an alkyl group having 1–8 carbon atoms, AO is an oxypropylene group, EO is an oxyethylene group, m and n independently denote an integer of 1 or more, and said $R^5$—O—$(AO)_m(EO)_n$—H has a viscosity of 3–150 cSt at 40° C.; and Formula (IV) is: $R^6$—O—$(AO)_m(EO)_n$—$R^7$ in which $R^6$ and $R^7$ are identical with or different from each other, and denote an alkyl group having 1–8 carbon atoms, AO is an oxypropylene group, EO is an oxyethylene group, m and n are identical with or different from each other, and denote an integer of one or more, and said $R^6$—O—$(AO)_m(EO)_n$—$R^7$ has a viscosity of 3–150 cSt at 40° C.

9. The process according to claim 8, wherein said benzotriazole derivative of said formula (I) is mixed in an amount of 1.0–10 parts by weight relative to 100 parts by weight of said base oil.

10. The process according to claim 8, wherein said benzotriazole derivative of said formula (I) is mixed in an amount up to 5 parts by weight relative to 100 parts by weight of said base oil.

11. The process according to claim 8, wherein in said benzotriazole derivative of said formula (I), $R^1$ is selected from the group consisting of H and an alkyl group having 1–4 carbons, and $R^2$ and $R^3$ are each an alkyl group having 4–18 carbon atoms.

12. The process according to claim 11, wherein in said benzotriazole derivative of said formula (I), $R^1$ is selected from the group consisting of H and an alkyl group having 1 carbon atom, and $R^2$ and $R^3$ are each an alkyl group having 4–12 carbon atoms.

13. The process according to claim 8, wherein $R^1$ is H.

14. The process according to claim 8, wherein $R^1$ is a methyl group.

* * * * *